United States Patent [19]

Eschen

[11] 4,352,750

[45] Oct. 5, 1982

[54] FRICTION MATERIAL FOR RAILROAD BRAKE SHOES

[75] Inventor: Frank W. Eschen, San Diego, Calif.

[73] Assignee: Manville Service Corporation, Denver, Colo.

[21] Appl. No.: 289,140

[22] Filed: Aug. 3, 1981

[51] Int. Cl.³ .............................................. C08L 61/06
[52] U.S. Cl. ............................... 523/156; 260/998.13; 524/594; 524/407
[58] Field of Search .............................. 260/38, 998.13

[56] References Cited

U.S. PATENT DOCUMENTS 4,051,097 9/1977 Aldreich ................................ 260/38
4,178,278 12/1979 Reynolds .......................... 260/42.22
4,219,452 8/1980 Littlefield .............................. 260/38

Primary Examiner—Lewis T. Jacobs
Attorney, Agent, or Firm—Robert M. Krone; Joseph J. Kelly; John D. Lister

[57] ABSTRACT

A railroad brake shoe composition free of fiber reinforcement comprising, in percent by weight:
  Phenolic Resin Binder: 1–15%
  Carbonaceous Component: 30–60%
  Organic Component: 15–30%
  Inorganic Component: 5–35%
  Friction Modifiers: 1–15%
  Additives: 1–7%.

7 Claims, No Drawings

FRICTION MATERIAL FOR RAILROAD BRAKE SHOES

BACKGROUND OF THE INVENTION

The invention herein relates to friction materials for brakes suitable for railroad service.

Over the years a number of different types of composition railroad brake shoes have been described. These have normally been composed of a rubber and/or resin matrix heavily reinforced with asbestos fiber and containing lead in the form of elemental lead and/or lead oxides and friction modifiers such as iron chromite, silicon carbide and the like as critical components. Typical compositions have been described in U.S. Pat. Nos. 2,686,140; 2,861,964; 3,152,099; 3,390,113; 3,832,325 3,959,194 and 4,178,278. Many of the materials described in the afore-mentioned patents have enjoyed widespread commercial success as railroad brake shoe compositions under the trademark COBRA. However, environmental and health concerns have led purchasers and therefore manufacturers to seek friction material compositions which contain neither asbestos fiber nor lead metal or its compounds. Recently, a composition containing little or no lead was disclosed. This was found to be quite advantageous in reducing wheel wear, particularly where softer steel wheels are used. See the aforesaid U.S. Pat. No. 3,959,194. Efforts to eliminate asbestos fiber from the brake shoe compositions have been beset with major difficulties, primarily because the asbestos fiber contributed a unique combination of reinforcement and thermal properties to the compositions. During service application brake shoes undergo significant physical stresses and also experience substantial temperature increases, often reaching peak temperatures in excess of 800° F. Previously, fibrous materials other than asbestos such as certain organic fibers, steel fibers and combinations of steel fiber and metal grit have been found suitable to adequately withstand the thermal and physical forces involved in railroad service.

Conventional AAR (Association of American Railroads) service for standard freight cars constitutes the large majority of the uses of friction materials and therefore many of the previous compositions were directed to such end use. Consequently, a basic friction material composition for molded brake shoes which is asbestos-free and suitable for use in AAR service has been sought, which would meet the service requirements and be economical to manufacture.

BRIEF SUMMARY OF THE INVENTION

The invention herein is a molded fiber reinforcement-free friction material suitable for railroad use which comprises, in percent by volume:
Phenolic Resin Binder: 2-15%
Carbonaceous Component: 30-60%
Organic Component: 15-30%
Inorganic Component: 5-35%
Friction Modifiers: 1-15%
Additives: 1-7%

In the preferred embodiments the composition may also contain from 5% to 10% by volume of friction modifiers and from 5% up 10% by volume of phenolic resin binder; the carbonaceous component 30-50% by volume and the inorganic component from 15% to 25% by volume and the organic component from 20% to 25% by volume.

DETAILED DESCRIPTION AND PREFERRED EMBODIMENTS

In use, the product of this invention is used in various types of railroad service are categorized on the basis of the contact pressure which is applied across the face of the brake shoe during typical brake application. In service the actual pressures will depend on the type of railroad equipment on which the brake is used, whether light to emergency brake application is considered, and similar factors. The distinctions, however, are evident and will be clearly understood by those skilled in the art. In addition, AAR service and heavy duty service commonly employ tread brakes as contrasted to disc brakes.

It is readily apparent from the foregoing that any particular composition selected for AAR use must have good thermal properties as well as undergoing an evaluation of the effect the material will have in use on the metal wheel. These factors and others combine to make the selection of components more of an art than a precise science. Small changes in the proportion of one component with respect to another can produce considerable differences in the final performance of the brake shoe. For example some combinations of materials while exhibiting good friction characteristics in use may provide to be too hard on the metal railroad wheel to be satisfactory for long term use.

With these many considerations and others in mind the composition of the present invention has surprisingly been found to exhibit the desired characteristics for a molded brake shoe friction material to be a satisfactory substitute for asbestos or other fiber reinforced materials in railroad service.

The first and largest component in the present composition is an organic component which consists of a rubber components bonded together with a phenolic resin. The binder component and rubber matrix are the vehicles in which the other components are embedded. The organic component may contain mixtures of natural or synthetic rubber, together with elastomeric materials or a phenolic resin which may be vulcanized or otherwise cured to form a hard matrix for the remaining components. Of the rubbers preferred are the butyl rubbers, styrene-butadiene rubbers or nitrile rubbers. A number of varieties of the various natural or synthetic rubbers and phenolic resins are readily available and are widely described in the literature. Numerous rubbers are described in the *Vanderbilt Rubber Handbook* published by the R. T. Vanderbilt Company in 1968. Phenolic resins generally applicable for use in the present invention are described in the *Modern Plastics Encyclopedia*, Vol. 4, No. 10 (1970-1971). Cashew nut shell resins are preferred, primarily due to their excellent bonding and heat resistant properties. Such resins and their method or preparation are discussed in U.S. Pat. Nos. 2,686,140 and 2,861,964. The organic component may in some embodiments be composed entirely of rubber, although most preferably the organic component will comprise a mixture of rubbers and phenolic resin.

The components listed herein are variously measured as percent by volume rather than the more common percent by weight, except where noted. This is done because the volume percentage reflects the physical properties of a given shape and size of brake shoe despite variations in the actual chemical composition of the shoe, since in braking service an important factor is the amount of each material which is exposed at the braking surface which is in contact with the wheel tread. It also simplifies the description of the material of the present invention in that it avoids the necessity for recalculation of components to account for varying densities of materials selected, such as in the organic component.

The second component of the composition and one of the key components in any friction composition for brake shoes are the friction modifying agents described more fully hereinafter.

A further component of the present composition will be inorganic fillers. These may be a wide variety of granulated inorganic materials which do not substantially affect the friction properties of the composition, but are rather used to fill out the composition and reduce the necessity for using more of the expensive organic component. In addition, they also provide thermal properties to some degree, in that they serve as heat sinks. Typical of the materials which may be used include alumina, barytes, silica, iron oxides, whiting, talc, diatomite, clays and the like as well as mixtures of these various materials. Particle sizes will normally be in the range of from 4 to 75 microns. The inorganic fillers will normally be present as from 5 to 35 percent by volume, preferably 15 to 25 percent by volume of the composition. In the present invention it is important that the inorganic filler component contains neither asbestos fiber nor lead metal or lead compounds.

The third component of the present composition is a carbonaceous component which is composed of carbon particles in any of a variety of forms, such as carbon black, carbon flour, graphite or ground anthracite. A single material such as carbon black or mixtures of the various carbon-containing materials may be used. This component will normally be present in from 30 to 60 volume percent, preferably 30 to 50 volume percent. Normally the particle size of the carbonaceous particles will be in the range from 0.02 to 150 microns. These materials have been and are incorporated in friction materials for several reasons including color, to provide resistance to U.V. degradation of the polymerized materials reinforcement of the cured rubber component and the like.

The final materials required in the present invention are "additives" used to vulcanize, cure or otherwise modify the rubbers and resins in the organic component. These will naturally vary depending upon the nature of the particular organic component used, and the final physical properties sought but in general will include materials such as sulphur, zinc oxide, thiazoles, sulfenamides, dithiocarbamates, peroxides, anti-oxidants, retarders and other processing aids. A wide variety of such materials are described in the patent literature and the above-mentioned *Vanderbilt Rubber Handbook*. The additives will be present as from about 1 to 7 volume percent, preferably 2 to 4 volume percent.

The composition therefore may contain in the categories described: cashew nut shell resin and friction modifiers such as those inorganic materials which substantially affect the friction properties of the material. For the purposes of this invention, it will be considered that such friction modifiers are commonly minerals or ceramics having a Mohs hardness of greater than 5. Typical of such materials are silicon carbide, zircon, garnet, iron chromite and similar materials. The friction modifiers will be in the form of granules having particle sizes in the range from about 0.05 to 200 microns. The friction modifiers will be present as up to 15% volume percent, preferably 5% to 10% volume percent, of the composition. While the friction modifiers employed herein have been found to have utility in varying amounts in other brake shoe compositions including asbestos-reinforced friction compositions and compositions comtaining steel fibers alone or in combination with metal particles or "grit," the individual use in the amounts disclosed in a brake shoe composition having no reinforcing fiber is somewhat surprising. It will be evident to those skilled in the art from the descriptions of the examples below how best to mix and otherwise formulate the compositions of the present invention. Additional descriptions of various types of processing equipment including mixers and molds may be found in Stern, *Rubber: Natural and Synthetic* (2d en. 1967) and Rubber World, *Machinery and Equipment for Rubber and Plastics* (2d edn, 1963) and the patent literature.

The following molded brake compositions is a preferred embodiment of this invention, with all components listed as percent by weight and by volume:

EXAMPLE I

|  | PERCENT BY WT. | PERCENT BY VOL. |
| --- | --- | --- |
| Crumb Rubber with 10% talc | 12.74 | 23.36 |
| Rubbermakers' Sulfur | 0.51 | 0.45 |
| TMTD Rubber Accelerator | 0.25 | 0.33 |
| MBT Rubber Accelerator | 0.25 | 0.31 |
| Antioxidant | 0.13 | 0.22 |
| Stearic Acid | 0.13 | 0.28 |
| Zinc Oxide | 0.64 | 0.21 |
| Carbon Black Powder | 9.17 | 9.33 |
| Carbon Flour | 10.19 | 9.33 |
| Iron Chromite | 14.01 | 5.81 |
| Red Iron Oxide | 9.94 | 3.83 |
| Silicon Carbide Microgrit | 0.64 | 0.36 |
| Carbon Base Filler | 7.39 | 9.21 |
| Rubbermakers' Hard Clay | 18.85 | 13.39 |
| Hard Rubber Dust | 6.37 | 8.58 |
| Mineral Rubber | 3.18 | 5.61 |
| Liquid Cashew Nut Resin | 5.10 | 9.48 |
| Hexamethylenetetramine | 0.51 | 0.91 |
| Total | 100.00 | 100.00 |

Certain modifications in the foregoing composition can be made without losing the overall advantages of the molded friction material of the present invention. For example the antioxidant can be eliminated altogether as well as the stearic acid where unnecessary in the molding process. Variations such as these are commonly made in such formulations and can be made in practice without deleteriously affecting the advantages provided by the overall composition.

The important contribution described herein is that a friction composition as described herein can be satisfactory for AAR service without the presence of reinforcing fiber of any kind in a brake shoe tread material which passes the objective tests and other requirements for AAR service. The amounts of friction modifying agents, additives and processing and other aids can be adjusted by one skilled in the art to achieve the desired results.

The invention is therefore only limited by the scope of the appended claims.

What is claimed is:

1. A friction material fiber free composition suitable for use as a brake shoe for railroad service comprising by volume:
   Phenolic Resin Binder: 1-15%
   Carbonaceous Component: 30-60%
   Organic Component: 15-30%
   Inorganic Component: 5-35%
   Friction Modifiers: 1-15%
   With the balance of other additives being: 1-7%.

2. The friction material composition of claim 1 wherein the phenolic resin component comprises between 5% to 10% by volume of the composition.

3. The friction material composition of claim 2 wherein the carbonaceous component comprises between 30%-50% by volume of the composition.

4. The friction material composition of claim 3 wherein the inorganic component comprises 15% to 25% by volume of the composition.

5. The friction material composition of claim 4 wherein the friction modifier component comprises between 5% to 10% by volume of the composition.

6. The friction material composition of claim 5 wherein the organic component comprises between 20% to 25% by volume of the composition.

7. A friction material composition suitable for use as a molded brake shoe for railroad service consisting essentially of:
   Crumb Rubber with 10% talc: 23.36%;
   Rubbermakers' Sulfur: 0.45%;
   TMTD Rubber Accelerator: 0.33%;
   MBT Rubber Accelerator: 0.31%;
   Antioxidant: 0.22%;
   Stearic Acid: 0.28%;
   Zinc Oxide: 0.21%;
   Carbon Black Powder: 9.33%;
   Carbon Flour: 9.33%;
   Iron Chromite: 5.81%;
   Red Iron Oxide: 3.83%;
   Silicon Carbide Microgrit: 0.36%;
   Carbon Base Filler: 9.21%;
   Rubbermakers' Hard Clay: 13.39%;
   Hard Rubber Dust: 8.58%;
   Mineral Rubber: 5.61%;
   Liquid Cashew Nut Resin: 8.48%; and
   Hemamethylenetetramine: 0.91%.

* * * * *

UNITED STATES PATENT AND TRADEMARK OFFICE
CERTIFICATE OF CORRECTION

PATENT NO. : 4,352,750
DATED : October 5, 1982
INVENTOR(S) : Frank W. Eschen

It is certified that error appears in the above—identified patent and that said Letters Patent is hereby corrected as shown below:

Column 5, claim 4 should be amended as follows:

4. The friction material composition of Claim 3 wherein the inorganic component comprises between 15% to 20% by volume of the composition.

Signed and Sealed this

Eleventh Day of January 1983

[SEAL]

Attest:

Attesting Officer

GERALD J. MOSSINGHOFF
Commissioner of Patents and Trademarks